Figure 1:
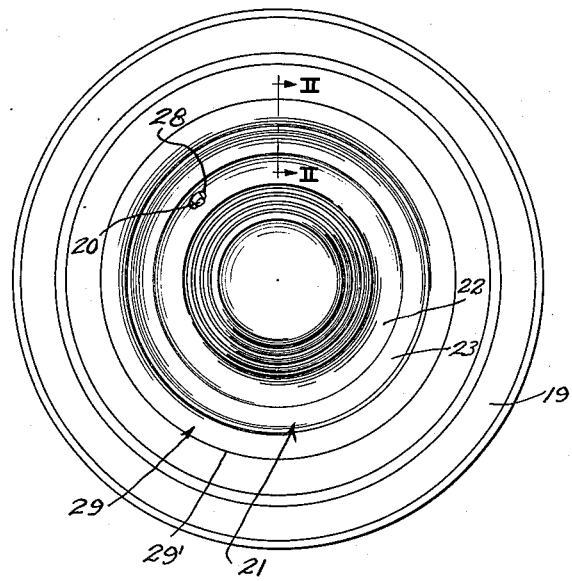

March 7, 1961 — J. V. SHOEMAKER — 2,973,992

WHEEL COVER

Filed Dec. 23, 1957

Inventor
JOHN V. SHOEMAKER

United States Patent Office 2,973,992
Patented Mar. 7, 1961

2,973,992

WHEEL COVER

John V. Shoemaker, Detroit, Mich., assignor to Lyon Incorporated, Detroit, Mich., a corporation of Delaware Filed Dec. 23, 1957, Ser. No. 704,419

10 Claims. (Cl. 301—37)

The present invention relates to improvements in wheel structures and more particularly concerns the provision of novel means for providing a wheel with simulated white side walls for a tire on the wheel.

For ornamental purposes, automobile tires are commonly provided with white side walls, the remainder of the tire being of a more or less black appearance. The white rubber used for a white side wall is applied as a veneer and is of a different composition than the remainder or body of the tire and actually requires a different vulcanizing treatment to the extent that the temperature and time of cure are somewhat different than for the black rubber of the tire body. This has created some necessity for compromise in the vulcanization of tires with white side walls, generally resulting in a sacrifice of quality in the body of the tire including the tread and principal side wall portions thereof.

To overcome the disadvantages of cure compromise, it has been proposed to secure the white side wall portion or veneer to the side wall of the tire after the tire has been vulcanized. Such after-attached side wall members are inherently liable to such disadvantages as peeling, and the like, and of course require a separate attachment or vulcanizing operation that raises cost. It has also been heretofore proposed to provide separate simulated white side wall ring members that are secured between the terminal rim flange of the tire and the bead portion of the tire and separably hug the side wall of the tire. Such simulated or mock tire white side wall rings require, of course, that the tire be deflated in order to install the ring members. Should such simulated white side wall rings become damaged, it is necessary to deflate the tire not only to remove the damaged ring but also to replace the ring. Furthermore, a disadvantage of such simulated white side wall rings is that, especially with tubeless tires there is interference with proper sealing, gripping engagement of the tire bead portion with the opposing surfaces of the tire rim. In the past, the rings have been clampingly interposed between the radial flange or the radial portion of the terminal rim flange and the tire side wall thereby interfering with the seal between the rim and a tubeless type tire.

It is accordingly an important object of the present invention to overcome the foregoing difficulties and disadvantages of the prior expedients and to provide a simulated white tire side wall of improved appearance and which can be applied or removed or replaced with or without removing the tire as is desired.

Another object of the invention is to provide a tire sidewall simulating flexible ring which is adapted to be carried in clamped engagement with the outer side of the wheel between the terminal rim flange and the adjacent side wall of the tire without interfering with the air seal between the radial flange or radial portion of the terminal rim flange.

According to the general features of the present invention there is provided a side wall ring member carried by the wheel having an inner marginal diameter slightly at variance with the radially outwardly facing grooved area of the terminal rim flange and with the ring member having its inner margin deflected and retainingly seated in the radially outwardly facing dished area and with an axially inner side wall area of the ring member abutted in frictional engagement with the tire.

According to still other features of the present invention there is provided interlocking protuberance and socket structure disposed in the dished or grooved area between the tire rim and side wall ring member.

Figure 2:
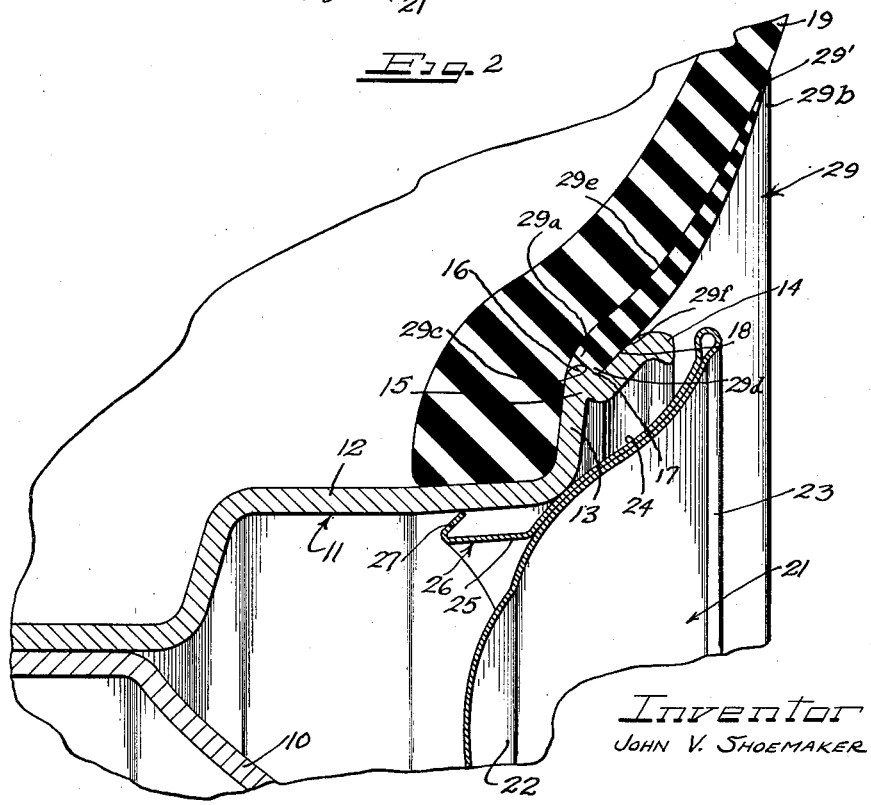

Other objects, features and advantages of the present invention will be readily apparent from the following detailed description of a preferred embodiment thereof, taken in conjunction with the accompanying drawings in which:

Figure 1 is a side elevation of a wheel structure embodying features of the present invention; and Figure 2 is an enlarged fragmentary cross-sectional view taken substantially on the line II—II of Figure 1 looking in the direction indicated by the arrows.

Referring to Figures 1 and 2, an automobile wheel including a disk spider wheel body 10 supports a tire rim 11 including an intermediate rim flange 12, an outer radially extending rim flange or radial terminal rim flange portion 13, and a generally axially outwardly extending terminal rim flange or axial terminal rim flange portion 14. The radial and axial rim flanges 13 and 14 are junctioned at 15 and at the junction are provided with an annular protuberance area or rib area 16 radially offset from the rim 11. Disposed axially outwardly of the protuberance or rib area 16 is an annular grooved rim area or socket area 17 which socket area 17 is defined at its axially inner side by the axially outer surface area of the protuberance area 16. The groove is defined at its axially outer side by a radially and axially outer inclined outer surface area 18 of the terminal rim flange. 14. The grooved rim area may also be defined in such a way whereby the tire side wall comprises its axially inner wall and the protuberance area 16 is disposed at the bottom of the thus defined grooved area 17.

A pneumatic tire 19 of preferably the tubeless type is carried by the tire rim 11 and may be inflated by directing air through a valve stem 20 as is shown in Figure 1. A wheel balancing weight (not shown) may be carried by the tire rim and more particularly the terminal rim flange 14, if desired.

For disposition at the outer side of the wheel and in covering relation to the wheel body 10, as well as the tire rim 11, there is provided a wheel cover 21 which is preferably of the self retaining type. To this end, the cover 21 includes an intermediate annular dished portion 22 radially outwardly of which is a generally radially and axially outwardly projecting annular marginal portion 23 of a diameter which overlies the terminal rim flange 14. An outer terminal underturned reinforcing and finishing flange 24 is disposed behind and abutted against the cover margin and leads into a generally axially inwardly extending cover retaining flange 25 of slightly smaller diameter than the axially outer portion of the tire rim intermediate flange 12 so as to be telescoped thereinto in the assembly. The flange 25 has a series of generally axially inwardly extending retaining fingers 26 provided with short and stiff generally radially and axially outwardly oblique terminals 27 retainingly engageable in gripping cover retaining relation with the intermediate flange 12 under resilient tension. The retaining fingers 26 are circumferentially spaced and are adapted to engage under resilient tension with the axial intermediate rim flange 12. When the fingers 26 are engaged with the wheel they are resiliently radially inwardly deflected from a normal diameter wherein the tips of the finger terminals 27 lie on a slightly larger diameter than the engaged portion of the intermediate flange 12 in the assembled relationship of the cover on the wheel.

The cover is applied to the outer side of the wheel by registering a valve stem aperture 28 with the valve stem 20. Then by applying axially inward pressure on the cover 21, the annular series of circumferentially spaced retaining fingers 26 are deflected enabling the cover to be retainingly engaged with the tire rim.

For affording the appearance of the tire 19 having a white side wall, a ring member 29 is provided which preferably is made from a rubber-like material and for which a synthetic rubber such as Butyl is especially desirable. Such synthetic rubber is characterized by especially desirable form sustaining resilient flexibility, good color qualities and excellent durometer control.

For affording tire side wall simulating shape for the ring member 29, it is of generally axially outwardly curved transverse or radial shape terminating in a reduced thin outer edge 29' engageable with the tire side wall with a fine line effect so as to appear integral with the tire.

The ring member 29 includes inner and outer annular marginal areas 29a and 29b. The ring member 29 is thickest at its inner marginal area 29a and becomes progressively thinner radially outwardly thereof through the outer marginal area 29b to the outer edge 29'.

Retaining means is disposed at the radially inner marginal area 29a. To this end, the radially innermost edge area of the trim ring 29 is provided with a radially inwardly facing radially outwardly channelled or grooved area 29c which is adapted to nestingly engage with the protuberance area 16 on the tire rim 11. More particularly, the radially inwardly facing inner edge of the trim ring 29 has a generally S-shaped cross sectional configuration complementary with the contour of the rim where abutted thereagainst. Axially adjacent the dished area 29c is a radially offset or projection area 29d which is snugly nested between the axially outer surface area of the protuberance area 16 and the radially and axially inclined surface area 18 of the terminal rim flange 14. The side wall ring member 29 has an axially inner surface area 29e in frictional engagement with the outer surface of the side wall of the tire 19 which frictional engagement tends to insure corotation of the side wall ring 29 with the tire 19. The side wall ring 29 also has an axially outer surface area 29f frictionally engaged against the radially and axially inclined radially facing surface area 18 of the terminal rim flange 14. Thus, when the side wall ring 29 is in assembly with the wheel it is abutted against the side wall of the tire along its axially inner surface area, it is abutted against the junction area 15 of the rim at its radially inner marginal edge and it is abutted against a radially and axially inclined surface area 18 at its axially outer surface area 29f.

The trim ring 29 may be assembled with respect to the tire rim either with the tire 19 mounted on the tire rim 11 or with the tire 19 removed from the tire rim 11. In any case, the inner marginal area 29a is deflected or stretched in a manner to allow it to become nestingly and snugly seated in the annular groove 17 and since the inner marginal area 29a has a diameter normally slightly smaller than the diameter of the radially outer surface of the annular grooved area 17, a snug engagement may be brought about between the tire rim 11 and the wheel. By virtue of the flexible nature of the trim ring 29 and the fact that the side wall ring 29 is of a tapered cross section with its most reduced area at its outer marginal area 29b or edge 29' the side wall ring member is adapted to snugly adapt itself with the outer surface area of the side wall of the tire 19. In fact, when the wheel is subjected to normal manner, there is a tendency for the side wall ring 29 to become attached to the tire 19. The adhesion between the side wall of the tire 19 and the axially inner surface area 29e of the trim ring 29 is of a type which allows a tire 19 and the side wall ring 29 to rotate in unison together.

To remove the side wall ring 29 from the wheel, the tire 19 may be first removed if it is first desired, or the side wall ring 29 may be removed without removing the tire 19. To remove the side wall ring 29 from the outer side of the wheel, the tire must be at least partially deflated and then the adhesion between the tire and the trim ring should be broken by pulling the flexible outer marginal area 29b of the trim ring axially away from the tire 19. A suitable pry-off tool, such as a screwdriver may be wedged between the inner marginal area 29a of the side wall ring 29 and the radially outer surface of the generally axial terminal rim flange 14. Due to the flexible nature of the inner marginal area 29a it may be deflected radially outwardly either by using a pry-off tool or by manually grasping and stretching (by pulling radially) the outer marginal area 29b of the trim side wall ring 29 whereupon the marginal area 29b may be pulled axially outwardly from assembly with the wheel.

In view of the foregoing it will now be appreciated that the tire need not be removed from the wheel or from the brake drum in order to permit the ornamental ring to be removed from the wheel. By deflating the tire until it is soft the ornamental ring may be pulled from between the tire rim and the tire in a much easier and simpler manner with respect to the ordinary practice followed today. When the ornamental ring is being removed, the tire bead carried on the intermediate rim flange 12 need not be broken and as a consequence a considerable amount of time is saved for the wheel need not be removed from the wheel axle and a bead-breaker need not be employed to break the seal between the tire and the tire rim as was the practice with earlier types of ornamental rings which had their inner margins engaged between the tire and the radial rim flange 13. Where a tubeless tire is used, the instant ring does not interfere with proper sealing between the tire rim and the tire bead as compared to earlier types of rings such as the one that had its inner margin disposed between the tire and the radial rim flange 13.

Although the tire side wall simulating ring 29 may be colored white, in line with popular demand for dress up or ornamental effect of white side walls on the tire, it will be appreciated that the ring may be provided with any other desired color as may be dictated from time to time by styling or user preferences, such as to distinguish various makes or models of automobiles and to harmonize with decorative design.

It will be understood that modifications and variations may be effected without departing from the scope of the novel concepts of the present invention.

I claim as my invention:

1. In a wheel structure, a wheel including a pneumatic tire mounted on a tire rim and with the tire rim having an outer margin defined by junctioned radial and axial rim flanges with the axial rim flange having a radially outer surface area inclined radially and axially outwardly spaced axially of a side wall area of the tire and with an annular radially outwardly facing grooved area defined therebetween, a side wall ring member carried by the wheel having an inner marginal area with a diameter slightly at variance with the diameter of the grooved area and having its inner marginal area nested and retainingly seated in the radially outwardly facing grooved area and with an axially inner side wall area of the ring member abutted in frictional engagement with the tire.

2. In a wheel structure, a wheel including a pneumatic tire mounted on a tire rim and with the tire rim having an outer margin defined by junctioned radial and axial rim flanges with the axial rim flange being disposed radially outwardly of the radial rim flange and having a radially outer surface area inclined radially and axially outwardly spaced axially of a side wall area of the tire and with an annular radially outwardly facing grooved area defined therebetween, a side wall ring member carried by the wheel having an inner marginal area with a diameter slightly at variance with the diameter of the grooved area and having its inner mraginal area nested and retainingly seated in the radially outwardly facing grooved area and with an axially inner side wall area of the ring member abutted in frictional engagement with the tire, said ring member being comprised of a rubber-like material and being disposed in its entirety on the radially outer side of the axial rim flange.

3. In a wheel structure, a wheel including a tubeless tire mounted on a tire rim and with the tire rim having an outer margin defined by junctioned radial and axial rim flanges with the axial rim flange having a radially outer surface area inclined radially and axially outwardly spaced axially of a side wall area of the tubeless tire and with an annular radially outwardly facing grooved area defined therebetween, a side wall ring member carried by the wheel having an inner marginal area with a diameter slightly at variance with the diameter of the grooved area and having its inner marginal area nested and retainingly seated in the radially outwardly facing grooved area and with an axially inner side wall area of the ring member abutted in frictional engagement with the tire, the side wall ring member being carried between the tire rim and the tire substantially without interfering with the seal between the tubeless tire and the tire rim including the radial rim flange.

4. In a wheel structure, a wheel including a pneumatic tire mounted on a tire rim and with the tire rim having an outer margin defined by junctioned radial and axial rim flanges with the axial rim flange comprising the radially outermost area of the tire rim and having a radially outer surface area inclined radially and axially outwardly spaced axially of a side wall area of the tire and with an annular radially outwardly facing grooved area defined therebetween, a side wall ring member carried by the wheel having an inner marginal area with a diameter slightly at variance with the diameter of the grooved area and having its inner marginal area nested and retainingly seated in the radially outwardly facing grooved area and with an axially inner side wall area of the ring member abutted in frictional engagement with the tire, said side wall ring member having a channeled ring area at its inner marginal area and said tire rim provided with a protuberance area in said grooved area with said protuberance area snugly engaged with said channelled ring area.

5. In a wheel structure, a wheel including a pneumatic tire mounted on a tire rim and with the tire rim having an outer margin defined by junctioned radial and axial rim flanges with the axial rim flange comprising the radially outermost area of the tire rim and having a radially outer surface area inclined radially and axially outwardly spaced axially of a side wall area of the tire and with an annular radially outwardly facing grooved area defined therebetween, a side wall ring member carried by the wheel having an inner marginal area with a diameter slightly at variance with the diameter of the grooved area and having its inner marginal area nested and retainingly seated in the radially outwardly facing grooved area and with an axially inner side wall area of the ring member abutted in frictional engagement with the tire, said side wall ring member having a channelled ring area at its inner marginal area and said tire rim provided with a protuberance area in said grooved area with said protuberance area snugly engaged with said channelled ring area, said protuberance area being disposed at the junction of said radial and axial flanges and said channelled ring area being channelled radially outwardly and disposed at the inner marginal edge area of said marginal area.

6. In a wheel structure, a wheel including a pneumatic tire mounted on a tire rim and with the tire rim having an outer margin defined by junctioned radial and axial rim flanges with the axial rim flange comprising the radially outermost area of the tire rim and having a radially outer surface area inclined radially and axially outwardly spaced axially of a side wall area of the tire and with an annular radially outwardly facing grooved area defined therebetween, a side wall ring member carried by the wheel having an inner marginal area with a diameter slightly at variance with the diameter of the grooved area and having its inner marginal area nested and retainingly seated in the radially outwardly facing grooved area and with an axially inner side wall area of the ring member abutted in frictional engagement with the tire, and interlocking protuberance and socket structure disposed in said grooved area between the tire rim and the side wall ring member.

7. In a wheel structure, a wheel including a tire rim having an outer margin defined by junctioned radial and axial rim flanges with a radially outwardly facing grooved rim area generally at the junction of the rim flanges and with a tire carried on the wheel in abutment with the tire rim and the radial rim flange radially inwardly of the grooved rim area, a side wall ring member carried by the wheel having an inner marginal diameter slightly at variance with the radially outwardly facing grooved rim area and having its inner margin deflected and retainingly seated in the radially outwardly facing grooved rim area radially outwardly of the radial rim flange and with an axially inner side wall area of the ring member abutted in frictional engagement with the tire.

8. In a wheel structure, a wheel including a tire rim having an outer margin defined by junctioned radial and axial rim flanges with a radially outwardly facing grooved rim area generally at the junction of the rim flanges and with a tire carried on the wheel in abutment with the tire rim and the radial rim flange radially inwardly of the grooved rim area, a side wall ring member carried by the wheel having an inner marginal diameter slightly at variance with the radially outwardly facing grooved rim area and having its inner margin deflected and retainingly seated in the radially outwardly facing grooved rim area radially outwardly of the radial rim flange and with an axially inner side wall area of the ring member abutted in frictional engagement with the tire, said inner margin having a radially inwardly facing radially outwardly grooved surface area and with the junction of the rim flanges provided with a protuberance area nestingly engaged with the radially inwardly facing radially outwardly grooved surface area.

9. In a wheel structure, a wheel including a tire rim having an outer margin defined by junctioned radial and axial rim flanges with a radially outwardly facing grooved rim area generally at the junction of the rim flanges and with a tire carried on the wheel in abutment with the tire rim and the radial rim flange radially inwardly of the grooved rim area a side wall ring member carried by the wheel having an inner marginal diameter slightly at variance with the radially outwardly facing grooved rim area and having its inner margin deflected and retainingly seated in the radially outwardly facing grooved rim area radially outwardly of the radial rim flange and with an axially inner side wall area of the ring member abutted in frictional engagement with the tire, said axial rim flange having a radially outwardly inclined surface area defining one side wall of the grooved rim area spaced axially of the tire with the inner margin of the side wall ring member telescoped radially between the tire and the inclined surface in abutting retained assembly therewith.

10. In a wheel structure, a wheel including a tire rim having an outer margin defined by junctioned radial and axial rim flanges having a grooved rim area and with a radially outwardly bulged rim area generally at the junction of the rim flanges and with a tire carried on the wheel in abutment with the tire rim and the radial rim flange radially inwardly of the grooved rim area, a side wall ring member carried by the wheel having an inner marginal diameter slightly at variance with the radially outwardly bulged area and having its inner margin deflected and retainingly seated on the radially outwardly bulged area and with an axially inner side wall area of the ring member abutted in frictional engagement with the tire, said side wall ring member having a radially outwardly grooved ring area snugly engaged in assembly with the radially outwardly bulged rim area.

References Cited in the file of this patent

UNITED STATES PATENTS

| | | |
|---|---|---|
| 2,198,978 | Sauer | Apr. 30, 1940 |
| 2,510,990 | Lyon | June 13, 1950 |
| 2,691,550 | Nickerson | Oct. 12, 1954 |
| 2,696,409 | Barnes | Dec. 7, 1954 |
| 2,822,016 | Billingsley | Feb. 4, 1958 |

FOREIGN PATENTS

| | | |
|---|---|---|
| 1,061,278 | France | Nov. 23, 1953 |